UNITED STATES PATENT OFFICE.

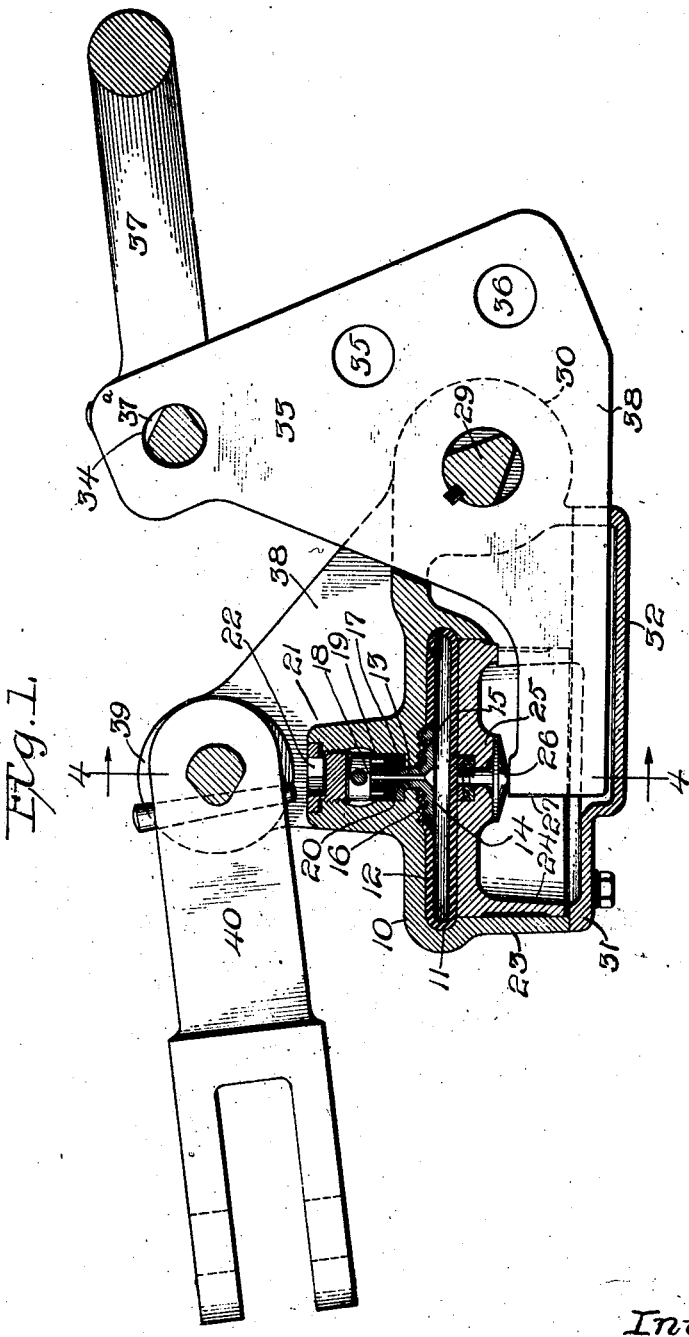

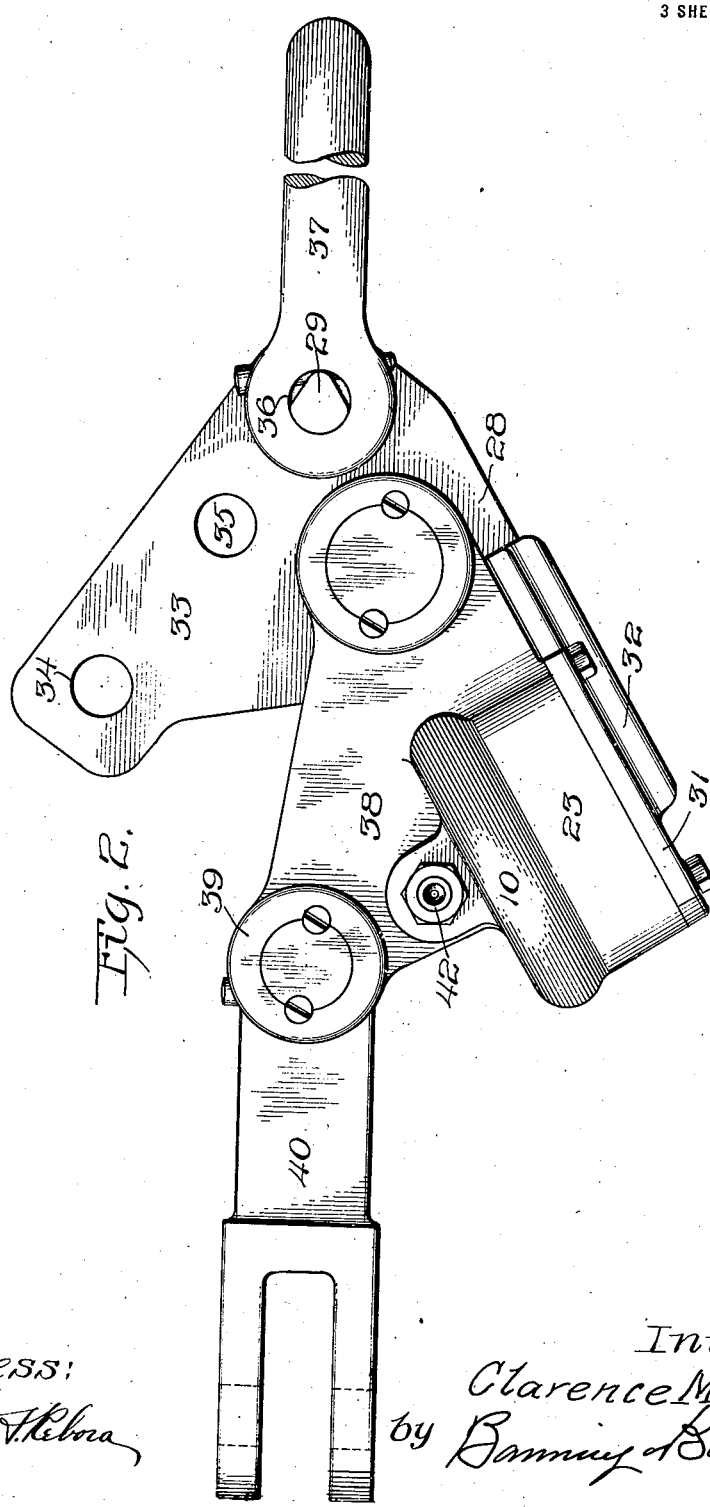

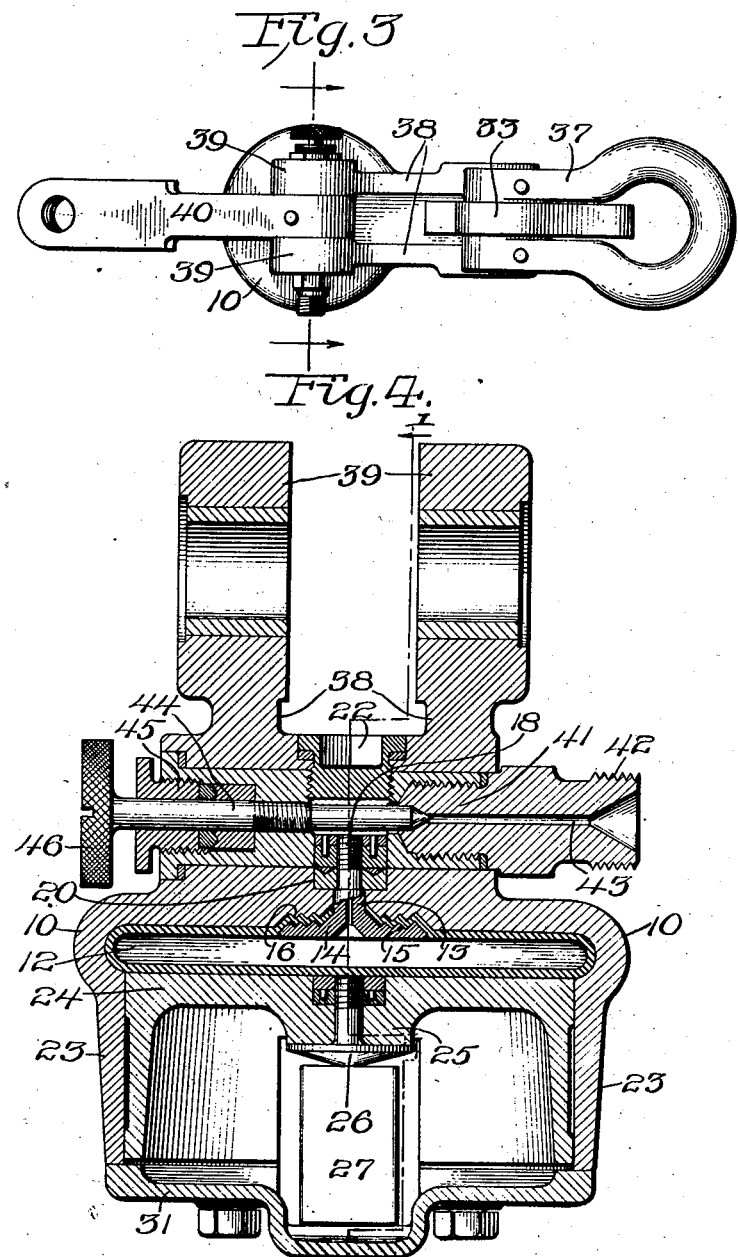

CLARENCE M. EASON, OF MOLINE, ILLINOIS, ASSIGNOR TO HYATT BEARINGS DIVISION, GENERAL MOTORS CORPORATION, OF NEWARK, NEW JERSEY, A CORPORATION OF DELAWARE.

DYNAMOMETER.

1,417,462.     Specification of Letters Patent.     Patented May 23, 1922.

Application filed May 20, 1920. Serial No. 382,726.

*To all whom it may concern:*

Be it known that I, CLARENCE M. EASON, a citizen of the United States, residing at Moline, in the county of Rock Island and State of Illinois, have invented certain new and useful Improvements in Dynamometers, of which the following is a specification.

This invention pertains to dynamometers for use primarily in registering the pull of tractors or similar implements by the use of liquid under pressure; and the object of the present invention is to so arrange the mechanism to which the tractor and trailer are secured that by changing the location of the point of attachment a lever effect can be secured by which the resistant effects of the medium under pressure will be compounded, so that effects of a degree greatly in excess of the normal capacity of the instrument can be recorded. In short, if a recording instrument having a limit of three thousand pounds be employed, under normal conditions, by relocating the point of attachment for the tractor, a leverage effect can be secured such that the record value of the recording instrument will be increased or multiplied, thereby increasing the range of the record.

The invention consists in the features of construction and combinations of parts hereinafter described and claimed.

In the drawings:

Figure 1 is a sectional elevation of the dynamometer with the attaching means in normal position to record pulls within the normal range of the recording instrument taken on the line 1—1 of Fig. 4;

Fig. 2 is a side elevation showing the point of attachment shifted to record the maximum pull;

Fig. 3 is a top or plan view of the device on reduced scale; and

Fig. 4 is a cross elevation mainly in section of the device on an enlarged scale taken on line 4—4 of Fig. 1, with the upper draft member removed.

The dynamometer comprises a disk shaped shell or casing 10 provided on its interior with a circular recess 11 within which is located a disk shaped hollow capsule 12, preferably of rubber, within which the liquid is contained. The orifice in the center of the upper side of the capsule has entered therethrough a nipple 13 provided with a disk shaped interior head 14 having serrations 15 on the face which bears against the interior surface of the rubber, which serrations coincide with similar serrations 16 around the wall of the casing. The nipple projects outwardly through a port in the casing which is shouldered at the point 17, and the tip 18 of the nipple is threaded to receive a pair of locking nuts 19 which bear against a suitable backing 20, so that as the nuts are tightened the serrated head of the nipple will be drawn against the inner face of the rubber to clamp the same tightly against the casing and thereby prevent the outflow of liquid save through the center port in the nipple.

The casing is provided with a center bored boss 21, within which the nipple and lock nuts are housed, the bore in the boss being closed by a threaded plug 22 which can be removed for the purpose of filling the capsule with liquid. The casing is provided on its under side with a curved flanged wall 23 which furnishes a bearing for a plunger 24 impinging against the under side of the capsule, which plunger is provided at its center with a boss 25 and a cone shaped contact disk 26 of hardened metal, which contact disk is acted upon by the inner end 27 of a bell crank lever 28 which is fulcrumed against a wedge shaped fulcrum block 29 carried between a pair of ears 30 laterally projecting from the casing 10.

The casing at its lower side has secured thereto a closure plate 31 which is provided with a channel 32 immediately below the inner arm of the bell crank 28 so as to afford clearance for the movements of the lever. The upper arm 33 of the bell crank lever is provided with an upper attaching hole 34, an intermediate attaching hole 35, and a lower attaching hole 36, which occupy variable relations with respect to the fulcrum point, and a selected one of these holes will furnish a point of attachment for a draft link 37 adapted to be secured to the draw bar of a tractor or the like which link is provided with a wedge shaped cross pin 37ª adapted to enter the selected hole.

The casing is further provided with a pair of upstanding spaced ribs 38 terminating in heads 39, between which is pivoted a draft member 40 whose pivotal point is centrally disposed with respect to the boss 21 on the casing.

The bore in the boss 21 registers with a laterally extending threaded plug 41 having a threaded neck 42 to which may be coupled a flexible tube leading to the recording instrument. The plug is provided with a port 43 which is normally in communication with the center bore in the boss, and this port 43 can on occasion be closed by means of a needle valve 44 entered through a gland and packing 45 terminating in a knurled head 46 for manual adjustment. This needle valve is primarily intended to effect a closing of the port 43 to prevent the discharge of liquid when the dynamometer is not in use.

With the link connection 37 located in the position shown in Figure 1, it will be observed that the distance from the point of connection to the fulcrum point is exactly equal to the distance from the fulcrum point to the contact against the plunger 24, so that a one to one lever ratio is afforded, and draw bar pulls within the normal capacity of the recording instrument can be registered. By shifting the connecting link 37 to the intermediate hole 35, a two to one lever ratio will be secured, so that the draw bar pull can be multiplied by a two to one ratio without exhausting the registering capacity of the recording instrument. When the connection 37 is shifted to the lowermost hole 36 and a maximum pull is imparted, the parts will be shifted into the position shown in Fig. 2, with the two draft connections thrown into line as indicated, and with the parts thus adjusted the acting length of the power end of the lever will be but one-fourth of the acting length of the opposite end, so that a four to one ratio will be measured by computing the vertical distance between the line joining the two draft centers and the fulcrum point, as indicated, with the parts in the position shown in Fig. 2, and this computation gives a four to one ratio, as stated.

The device is of peculiar value in cases involving the measurement of a wide range of draft bar pulls, in that it permits the use of an instrument of moderate recording capacity and at the same time provides means for easily compounding the pressure effects in exact ratio, so that the record on the recording instrument can be likewise compounded. Since the correctness of the record thus obtained is dependent upon the exact ratio between the fulcrum point and the points of application of the power and force, it is desirable that these points of contact be afforded by hardened bearings, so that the accuracy of the instrument may be maintained.

I claim:

1. In a dynamometer, the combination of a casing provided with a recess, a flexible capsule located within the recess, means for establishing communication from the interior of the capsule to the exterior of the casing, a draft connection secured to the casing, a plunger slidable within the casing and bearing against the exposed side of the capsule, a fulcrum carried by the casing, a bell crank lever mounted upon said fulcrum, and a draft connection for said bell crank lever, adjustable to different positions to vary the lever ratio, substantially as described.

2. In a dynamometer, the combination of a casing provided with a recess adapted to contain liquid, means for establishing communication for the liquid within the recess to the exterior of the casing, a draft connection secured to the casing, a plunger slidable within the casing and adapted to act upon the liquid therein, a fulcrum carried by the casing, a bell crank lever mounted upon said fulcrum, and having its inner end in engagement with said plunger and a draft connection for said bell crank lever adjustable to different positions to vary the lever ratio, substantially as described.

3. In a dynamometer, the combination of a casing provided with a recess adapted to contain liquid, means for establishing communication for the liquid within the recess to the exterior of the casing, a draft connection secured to the casing on one side of the recess therein, a plunger slidable through the opposite side of the casing and adapted to act upon the liquid within the recess, a fulcrum carried by the casing, a bell crank lever mounted upon said fulcrum and having its inner end in engagement with the plunger, and a draft connection for the outer end of said bell crank lever, substantially as described.

4. In a dynamometer, the combination of a casing provided with a recess adapted to contain liquid, means for establishing communication for the liquid within the recess to the exterior of the casing, a draft connection secured to the casing on one side of the recess therein, a plunger slidable through the opposite side of the casing and adapted to act upon the liquid within the recess, a fulcrum carried by the casing, a bell crank lever mounted upon said fulcrum and having its inner end in engagement with the plunger, and a draft connection for the outer end of said bell crank lever, adjustable to different positions to vary the lever ratio, substantially as described.

5. In a dynamometer, the combination of a casing provided with a recess, a flexible capsule within the recess and adapted to contain liquid, means for establishing communication from the interior of the capsule to the exterior of the casing, a draft connection secured to the casing at a point normally above the casing, a plunger slidable within the casing and having a line of movement in transverse relation to the axis of the draft connection and bearing against the lower side of the capsule, a fulcrum carried by the casing, a bell crank lever mounted upon said fulcrum and having its free end in engagement with the lower side of the plunger, and a draft connection for said bell crank lever oppositely disposed with respect to the first draft connection, substantially as described.

6. In a dynamometer, the combination of a casing provided with a recess, a flexible capsule within the recess and adapted to contain liquid, means for establishing communication from the interior of the capsule to the exterior of the casing, a draft connection secured to the casing at a point normally above the casing, a plunger slidable within the casing and having a line of movement in transverse relation to the axis of the draft connection and bearing against the lower side of the capsule, a fulcrum carried by the casing, a bell crank lever mounted upon said fulcrum and having its free end in engagement with the lower side of the plunger, a draft connection for said bell crank lever oppositely disposed with respect to the first draft connection, and adjustable to different positions upon the bell crank lever to vary the lever ratio, substantially as described.

CLARENCE M. EASON.